United States Patent [19]

Lever et al.

[11] Patent Number: 4,810,510
[45] Date of Patent: Mar. 7, 1989

[54] METHOD OF SMOKING FOOD

[75] Inventors: Gordon Lever; Yoshitaka Yanagawa, both of Shizuoka, Japan

[73] Assignee: Nippon Light Metal Company Limited, Tokyo, Japan

[21] Appl. No.: 70,209

[22] Filed: Jul. 6, 1987

[30] Foreign Application Priority Data

Jul. 8, 1986 [JP] Japan .................................. 61-160602
May 18, 1987 [JP] Japan ............................. 62-72909[U]

[51] Int. Cl.$^4$ ............................................. A23B 4/04
[52] U.S. Cl. ...................................... 426/233; 99/482; 426/314; 426/315
[58] Field of Search ............... 426/314, 650, 655, 315, 426/233; 99/482

[56] References Cited

U.S. PATENT DOCUMENTS

3,615,729 10/1971 Baker et al. ........................... 426/314
3,861,292 1/1975 Gilliland et al. ....................... 426/314
4,558,196 12/1985 Babasade ............................... 426/314

*Primary Examiner*—George Yeung
*Attorney, Agent, or Firm*—William J. Daniel

[57] ABSTRACT

Disclosed are food smoker for household or restaurant use and method for food smoking with the smoker. The food smoker comprises a container containing a liquid wood or pellet(s) onto which the liquid wood is adsorbed, which is installed in the bottom part of the smoker body, a means for heating the container, and a means for holding a material (such as food) to be smoked in the inside of the smoker body. The food smoker is preferably provided with a means capable of radiating far infrared rays by the heat of the heating means at least around the holding means. The liquid wood can be recovered by distillation or solvent extraction of wood chips. For food smoking, the liquid wood or pellet(s) onto which the liquid wood is adsorbed is(are) heated in a container of the smoker body containing the food to be smoked, whereupon the volatilization rate of the liquid wood is controlled by the choice of the heating temperature and the total amount of the liquid wood. By the smoking method with the smoker, smoked foods with delicious taste can be obtained with ease, and the smoking operation is clean, simple and safe.

11 Claims, 7 Drawing Sheets

METHOD OF SMOKING FOOD

FIELD OF THE INVENTION

The present invention relates to a method of smoking food and apparatus for the method mainly for household or restaurant use.

DESCRIPTION OF THE PRIOR ART

Smoking of food at home or by restaurants is not very popular, although the taste of smoked food is quite appealing. This is believed to be due to the fact that smoking is a slow and messy operation. Also, people have limited their consumption of smoked food because of the possibility of carcinogenic compounds in the smoke or soot.

It is generally believed that it is the volatiles released from the wood during burning that gives the smoked food its pleasant taste. However, the standard process produces soot, other undesirable compounds and ash, and is thus a messy and possibly unsafe operation.

SUMMARY OF THE INVENTION

Accordingly, the objective of the present invention is to limit the above disadvantageous and to provide a method of smoking food by a clean, simple and safe operation and apparatus for the method.

The first embodiment of the present invention is to provide a method of smoking food, which comprises heating a liquid wood smoke of volatiles recovered from wood by distillation and condensation or other means or pellets onto which the liquid wood smoke is adsorbed in a container and smoking the food by treating it with a fumes of the volatiles.

The second embodiment of the present invention is to provide an apparatus for carrying out the smoking method of the first embodiment of the present invention, which comprises a heating means for directly or indirectly heating a small vessel containing the liquid smoke or the pellets onto which the liquid wood smoke is adsorbed so as to volatilize the said liquid wood smoke, as provided below the bottom of the container, and hooks or racks for suspending or holding the food to be smoked, as provided at pertinent portions in the container, and, if desired, an air cleaning device for discharging the exhaust fumes out of the container by a forced convection current or for absorbing these fumes by chemicals, in case the said container is a closed one.

Generation of fumes is achieved by the controlled volatilization of the liquid wood smoke by heating the liquid wook smoke (1) in the small vessel (32) as placed on the heating means (20), such as a hot plate, which is switched on during heating, as shown in FIG. 6, or preferably by heating the pellet discs ($30_1$) or the pellet balls ($30_2$) onto which the liquid wood smoke is adsorbed, as shown in FIG. 7 or FIG. 8. Using this procedure no soot is produced and the total amount of fumes can be minimized to that required to adequately flavour the food. The rate of volatilization of the liquid wood smoke can be controlled by the choice of the heating temperature and the total amount of the liquid wood smoke.

The liquid wood smoke is prepared by distillation of wood particles such as chips, shavings, sawdusts, etc., or by other methods such as solvent extraction or recovery of the fume as generated by combustion of woods, as shown in FIG. 11. In FIG. 11, the wood (86) is put in a heated fumegenerator (87) while an air is blown thereinto, and the generated fumes are trapped by spraying water in the adsorbing device (88) whereby the fume-containing water is caught in the tank (89). In the tank (89), the supernatant water is sucked up by the pump (90), and the water can be used for the spraying water into the adsorbing device. Specifically, the preferred method of the present invention is by vacuum distillation. The term liquid wood smoke can include the complete distillate or fractions of it or mixtures from several woods. Although many types of wood can be used, the preferred types are Cherry, Hickory, Apple, Alder, Mesquite, etc. That is, those normally used for food smoking.

The adsorbent can consists of any inert porous medium such as activated alumina, Florite (trade name by Tokuyama Soda), etc. The adsorbent can be in various forms although pellets in the form of tablets, balls or discs are preferred.

The liquid wood smoke is adsorbed or contained by the pellet by contact using standard techniques.

Controlled release of the fume is achieved by heating the pellet or liquid wood smoke container to a temperature of from 100 to 400° C., preferably from 150 to 300° C.

The food may be heated using the same source of heat or a separate one. The food temperature may be from 30 to 200° C., preferably from 60 to 120° C.

By choosing the appropriate combination of liquid wood, temperature and time, the food can be smoked from lightly to heavily to achieve the desired flavour.

The food can be suspended by hooks or placed in racks above the liquid wood fume usually within an oven or other suitable container.

As another embodiment of the present invention, the apparatus may be provided with a far infrared-radiating means capable of radiating far infrared rays by the heat of the heating means at least around the racks on which the material to be smoked such as food is placed. Preferably, the means comprises ceramic plates consisting essentially of aluminum oxide zirconium oxide, titanium oxide, silicon oxide or silicon nitride, which are set to stand up around the racks; or comprises base plates as coated with a film consisting essentially of aluminum oxide, zirconium oxide, titanium oxide, silicon oxide or silicon nitride, which are set to stand up around the racks. In this means, the above-mentioned aluminum oxide, zirconium oxide and the like raw materials can be a single component or a mixture of two or more components.

In addition, the above-mentioned far infrared-radiating means may be anyone which is arranged at least around the racks, and for example, the means can be fixed around the racks themselves, or can be fixed to the inner wall of the apparatus body around the racks, or further can be fixed to one position of the inner wall of the apparatus body around the racks provided that the racks themselves are made rotatable in the horizontal direction.

DETAILED DESCRIPTION OF THE INVENTION

Figure 1:
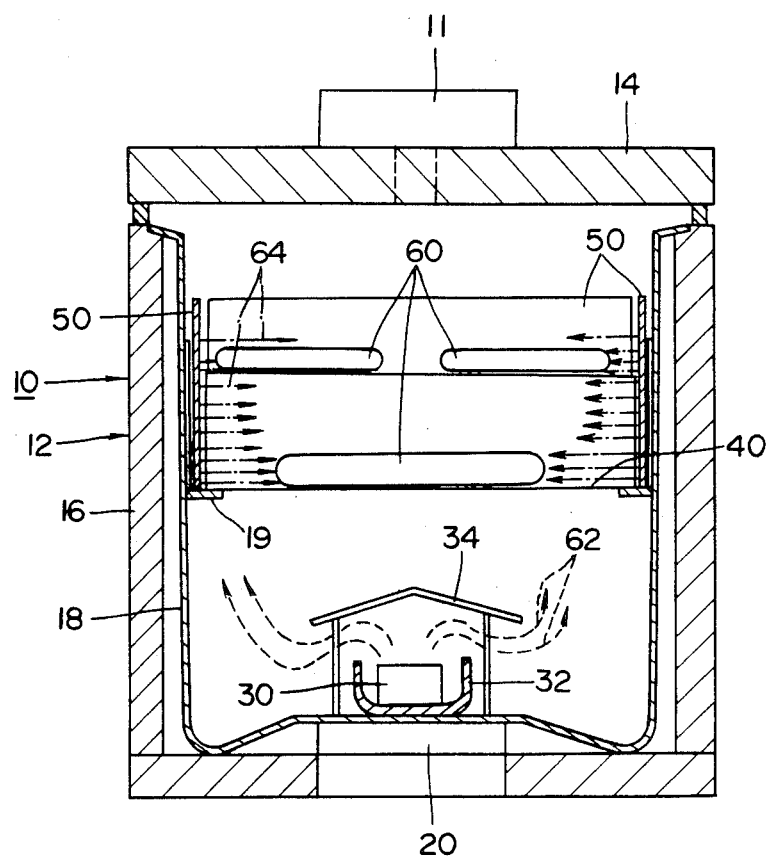
FIG. 1 is a cross-sectional view of one example of the food smoker of the present invention.
Figure 2:
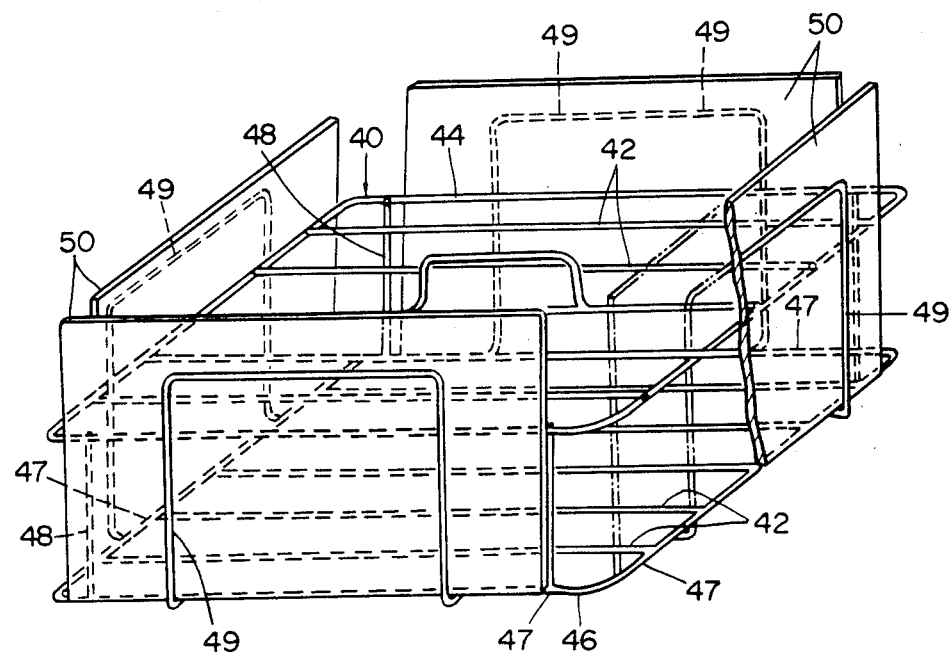
FIG. 2 is an oblique cross-sectional view to show the part of the racks and the far infrared-radiating plates of the example of FIG. 1.

FIG. 1 is a cross-sectional view of one example of the food smoker of the present invention, the main part of which comprises the heat-insulating apparatus body (10) of a closed system, the heater (20), which is a heating means and which is installed in the center part of the bottom of the apparatus body (10), the pellet (30), which is a fume-generating means for generating the smoking fume when heated by the heater (20) and which is installed above the heater (20), and the rack (40) for placing the material to be smoked (60), such as food, which is installed in the upper portion of the apparatus body (10).

The above-mentioned apparatus body (10) comprises the box-shaped jacket (12) and the lid part (14) to close the opening of the box-shaped jacket (12), and the box-shaped jacket (12) comprises the outer casing (16) made of a synthetic resin foam such as a glass wool, polyurethane, phenol resin or the like foam, and the Teflon-coated aluminum liner casing (18) as arranged inside the said outer casing (16); and the lid part (14) is made of a heat-insulating material such as a glass wool, like the outer casing (16) of the box-shaped jacket (12). The apparatus body (10) is not always necessary to be made of a heat-insulating material, although the type where the said apparatus body (10) is made of a heat-insulating material is explained herein.

Figure 6:
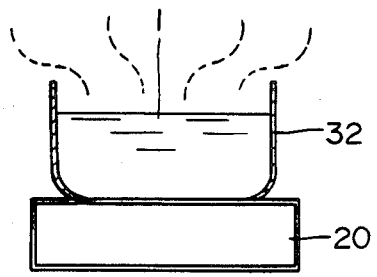
FIG. 6 through FIG. 8 are views to explain the volatilization of the liquid wood smoke.
Figure 7:
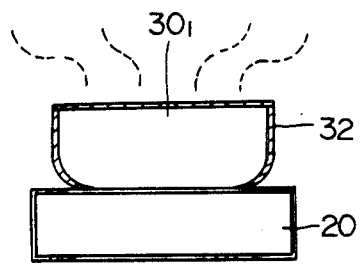
Figure 8:
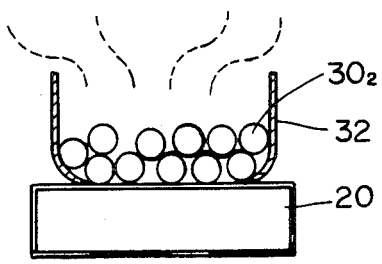
Figure 9:
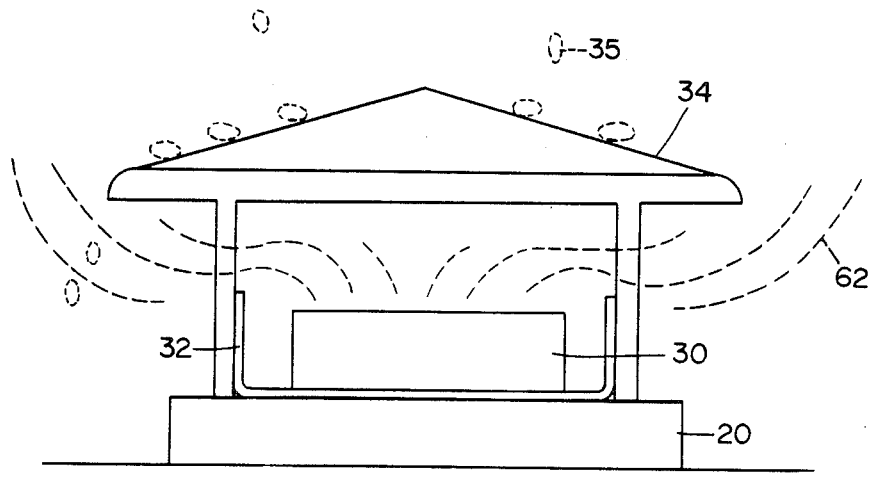
FIG. 9 shows a cover to prevent juice and fat contacting pellet.

The above-mentioned pellet (30) is made in the from of a solid containing a liquid wood smoke, for example, from Cherry, Hickory, Apple or the like, as shown in FIG. 7 or FIG. 8, and is put in the vessel (32); or alternatively, the liquid wood smoke, for example, from Cherry, Hickory or the like, can directly be put in the vessel (32), as shown in FIG. 6. The cover (34) is installed above the pellet (30), as shown in detail in FIG. 9, and the cover (34) can prevent the direct contact with pellet (35) of the juice and fat (35) which falls from the smoked material (60).

Figure 3:
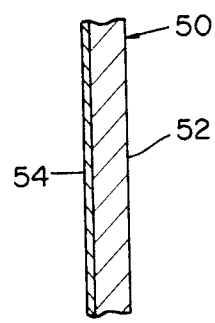
FIG. 3 is a cross-sectional view to show the main part of the far infrared-radiating plate of another example of the present invention.

The above-mentioned rack (40) is constituted by the square frames of the upper and lower rack bodies (44) and (46) having plural crosspieces (42), (42), ..., which are installed parallel to each other to span the respective frames, the frames being connected by the supports (48), (48, ... as installed between the frames at regular intervals; and this rack is releasably installed in the apparatus body (10) in such state that this is held by the projection holder (19) (see FIG. 1) as provided to project into the liner casing (18) of the apparatus body (10). The thus constituted rack (40) is preferably equipped with the squarish arch-shaped/brackets (install-ing/ 49), (49), ... in the respective edges (47), (47), ... of the lower rack body (46), and the far infrared-rediating plate (50), which is a far infrared-radiating means, is sandwiched and fixed between the installing bracket (49) and the upper rack body (44). In this case, the far infrared-radiating plate (50) can be made of a ceramic oxide plate consisting essentially of aluminum oxide, zirconium oxide, titanium oxide, silicon oxide or the like, or of a ceramic plate consisting essentially of silicon nitride or the like. In addition, the far infrared-radiating plate (50) is not always necessary to be made of the ceramic plate (50) which consists essentially of aluminum oxide, silicon nitride or the like, and this can also be an Alumite plate obtained by forming the aluminum oxide film (54) on the surface of the aluminum base plate (52) by anodic oxidation, or a plate formed by coating the coat film (54) of zirconium oxide, titanium oxide, silicon oxide or silicon nitride on the surface of the base plate (52) (see FIG. 3).

Further, the lid part (14) of the above-mentioned apparatus body (10) is equipped with the air cleaner (11) which can forcedly discharge the fume (62) in the apparatus body (10) out of the apparatus or which can absorb the fume (62) by mean of chemicals as contained in the cleaner.

In the food smoker apparatus of the present invention, which is constituted by the above-mentioned structure, when the pellet (30) is heated and fired by the heater (20), the smoking fumes (62) containing the volatiles of the liquid wood smoke are generated from the pellet (30), and these fumes (62) are contacted with the material (60) to be smoked. In one embodiment of the food smoker apparatus which is provided with the far infrared-radiating plate (50), when the far infrared-radiating plate (50) is heated by the heater (20), the far infrared rays (64) are radiated from the plate (50) to the material (60) being smoked, whereby the far infrared rays are absorbed into the inside of the material (60) and the material (60) being smoked can thus be uniformly heated in a shorter period of time.

Figure 4:
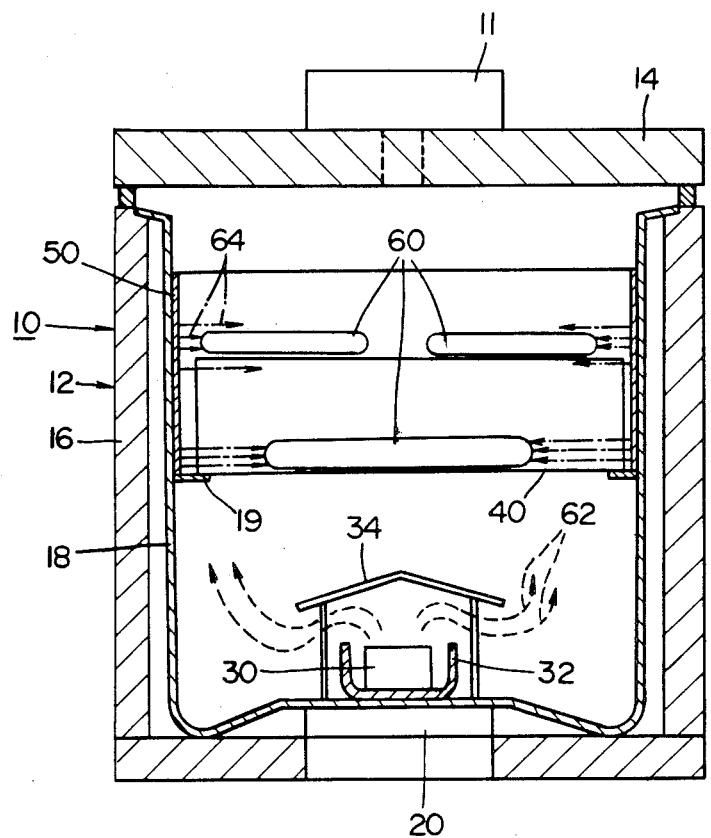
FIG. 4 is a cross-sectional view of another example of the food smoker of the present invention.

Next, FIG. 4 is a cross-sectional view of another example of the food smoker of the present invention, where the far infrared-radiating plate, which is a far infrared-radiating means, is installed to be fixed to the side of the apparatus body around the rack. Specifically, the far infrared-radiating plate (50) which is formed in the same manner as the above-mentioned first example or the far infrared-radiating plate (50) comprising the base plate (52) as coated with the far infrared-radiating film (54) such as aluminum oxide or the like is directly fixed to the surface of the liner casing (18) around the rack by means of a fixing means such as an adhesive or the like.

In the case of the second example, the other parts are same as those in the above-mentioned first example, and the same parts are numbered by the same numbers, the explanation of which is omitted herein.

Figure 5:
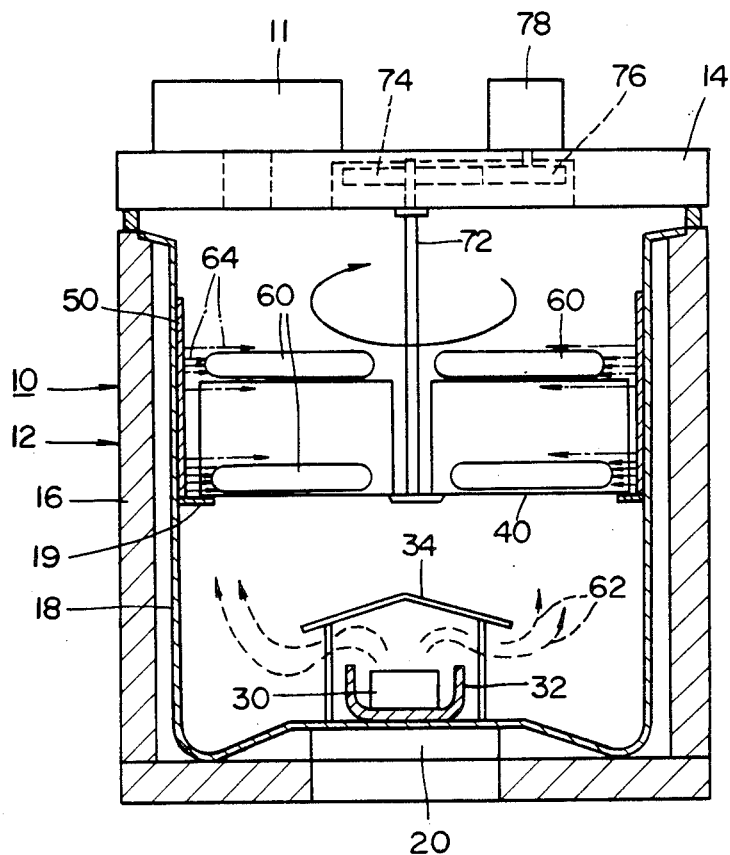
FIG. 5 is a cross-sectional view of still another example of the food smoker of the present invention.

FIG. 5 is a cross-sectional view of stil another example of the food smoker of the present invention, where the materials to be smoked are so set to be able to be more uniformly radiated by the far infrared rays. Specifically, the rack (40) was fixed to the end of the rotary shaft (72) as rotatably hung from the lid part (14) of the apparatus body (10), and the driving gear (76) to gear with the follow gear (74) as provided above the top of the rotary shaft (72) is drived by the driving motor (78) as put on the lid part (14), and the same far infrared-radiating plate (50) as in the above-mentioned first example and second example is partly installed around the rack.

By rotating the rack (40) in the smoker apparatus of this embodiment, the far infrared rays (64) from the far infrared-radiating plate (50) can wholly be irradiated to the material (60) being smoked, and further, the far infrared rays (64) can uniformly be irradiated thereto even though the far infrared-radiating plate (50) is not installed all around the rack (40).

Regarding the third example, although the case where the rack (40) is rotated, as being fixed to the rotary shaft (72) hung from the lid part (14), is explained hereinabove, the rotation of the rack (40) is not always necessary to be effected by the hunging system but can be effected by another system where the rack is rotatably supported on the bottom of the apparatus. In addition, the driving mechanism is not limited to only the above mentioned gear mechanism comprising the driving motor (78), the driving gear (76) and the follow gear (74), but it is a matter of course that any other rotation-driving mechanism, such as a belt-driving mechanism or a driving mechanism of direct rotation with the driving motor (78), can be utilized.

The following examples are intended to illustrate the present invention but not to limit it in any way.

LIQUID WOOD PREPARATION

Example 1

Figure 10:
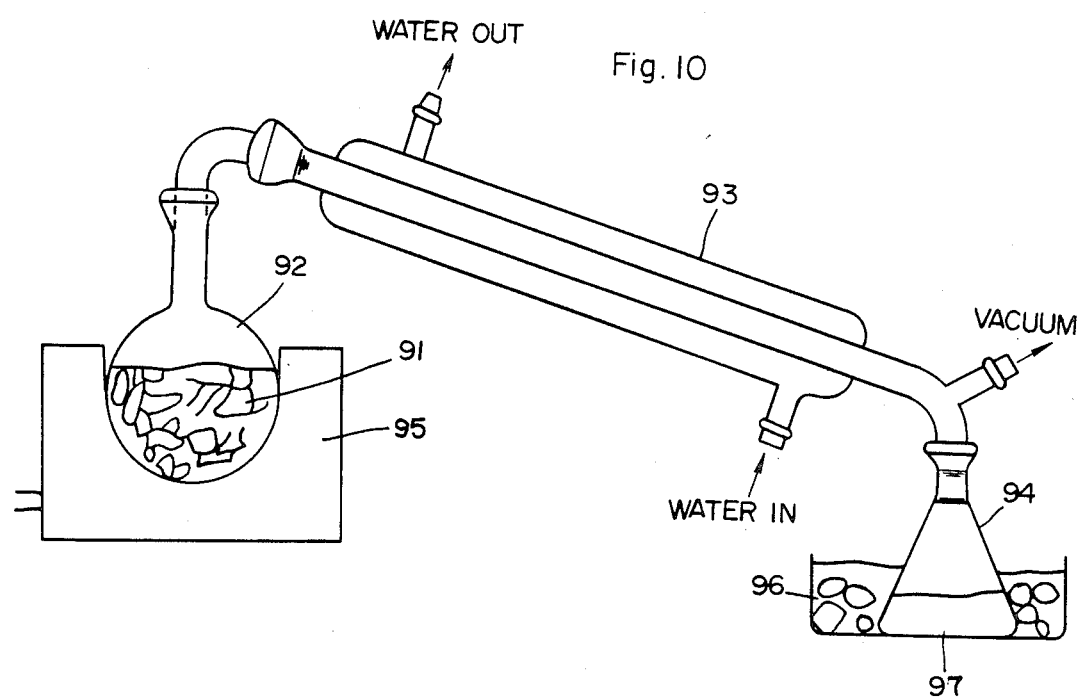
FIG. 10 is a diagram to show the structure of a vacuum distillation apparatus for liquid wood smoke preparation.
Figure 11:
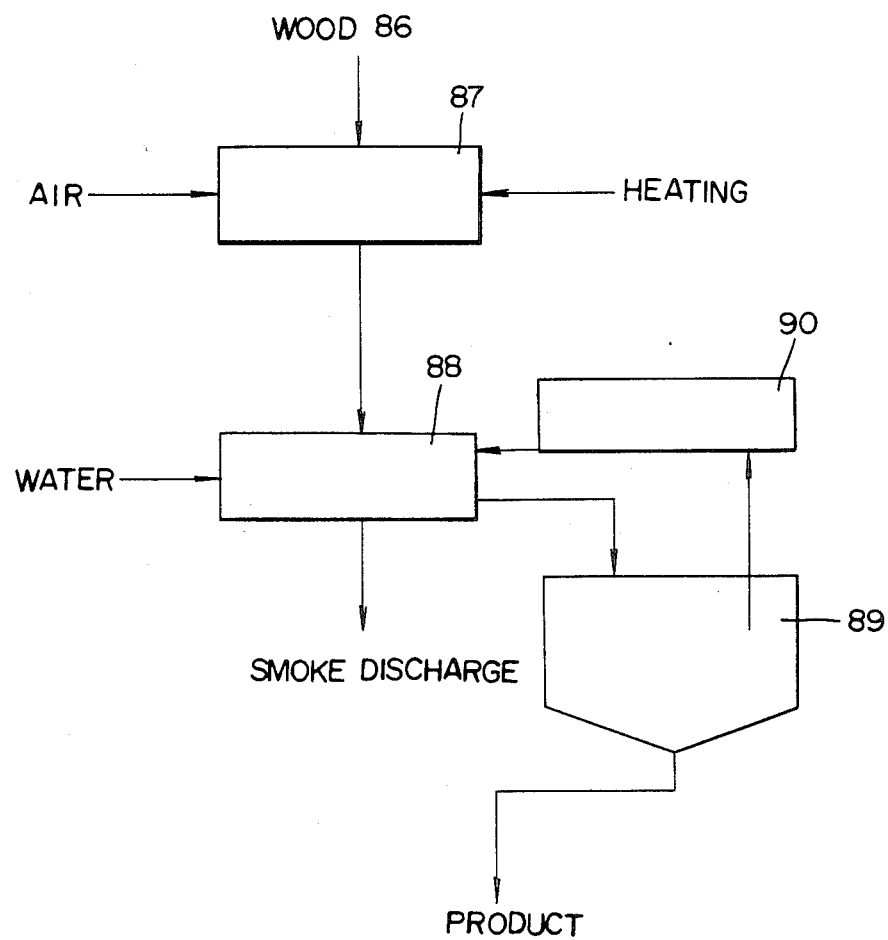
FIG. 11 is a diagram ot show the flow chart of another example for liquid wood smoke preparation.

The apparatus used was as shown in FIG. 10. 25 g of dry cherry wood chips (91) were placed in the round bottom flask (92) (300 ml) and the condenser (93) and the receiving flask (94) connected. Vaccum (not shown) was applied and 60 V applied to the 250 W mantle heater (95). A colorless liquid appeared in the condenser (93) after a few minutes. After 25 minutes, heating by the heater (95) was stopped and vacuum disconnected. 2.6 ml of distillate was collected. The vacuum was reconnected and the heating continued with the 65 V applied. A pale yellow liquid first appeared in the condenser (93) but the color got darker as the distillation proceeded. After 60 minutes total time the distillation was stopped. 8 ml of a pungent reddish liquor was recovered. The condenser (93) was washed with methanol and a further 2.5 ml of dark red viscous liquid was recovered (after removal of the methanol). The combined distillates (97) corresponded to 53% of the wood weight. (96) denotes ice or water.

Example 2

The procedure described in Example 1 was repeated using hickory chips. 3.2 ml of a colorless liquid, 9.0 ml of a pungent red liquid and 2.8 ml of condenser washings were recovered. The combined distillates corresponding to 60% of the hickory wood weight.

Example 3

The procedure described in Example 1 was repeated using alder chips. 2.4 ml of a colorless liquid, 10.4 ml of an orange/red liquid and 2.3 ml of dark red condenser washings were recovered. The combined distillates corresponded to 61% of the alder wood weight.

Example 4

The procedure described in Example 1 was repeated using mesquite chips. No colorless liquid was evolved. 6.2 ml of a pungent dark red liquid and 3 ml of a very dark liquid were recovered. The combined distillates corresponded to 42% of the mesquite weight.

Example 5

50 g of cherry wood chips were vacuum distilled for one hour in the apparatus shown in FIG. 10. 50 V was applied for 30 minutes and then 65 V for a further 50 minutes. After 50 minutes, the water in the condenser was drained to prevent acceleration of the higher temperature distillation. 29 g of distillate was recovered which corresponded to 58% of the wood weight (excluding condenser washings).

Example 6

Using the apparatus used in Example 1 except the flask was increased to 500 ml, 100 g of cherry wood chips were vacuum distilled with 60 V applied to the heater. After 30 minutes, the distillation was stopped and 6.8 g of colorless fraction No. 1 was recovered. The distillation was then continued with 65 V applied. After a further ten minutes, fraction No. 2 was collected that weighed 21.4 g and had a reddish color. The distillation was then continued at 70 V for a further 20 minutes, and 25.1 g of a dark red viscous liquid was recovered. Total weight of distillate recovered (excluding condenser washings) was equal to 53.4% of the initial wood weight.

ADSORPTION TESTS

Example 7

Florite ® pellets, 5 mm diameter (Tokuyama Soda Co., Ltd.) were contacted with the various liquid woods prepared in Examples 1 to 6. The test showed that it was possible to adsorb up to 2.5 g liquid wood/g Florite ®. With occasional mixing the adsorption time was about 15 minutes.

Example 8

Florite ® discs, 50 mm diameter ×20 mm deep were contacted with liquid wood smoke contained in an alumina foil dish. It was possible to adsorb about 2 g liquid wood smoke /g Florite ®. The depth of adsorption could be varied by changing the amount of liquid wood smoke. Typically the adsorption would be from 40 to 80% of the depth. Normally, the non-adsorbed face would be heated to release the fume. By varying the amount of liquid wood smoke and its depth of adsorption, the fume release rate could be controlled at fixed temperature. By varying the temperature, a wide range of volatilization rates could be obtained, for application to the different types of foods and quantities.

VOLATILIZATION OF LIQUID WOOD

Example 9

25 ml of cherry liquid wood smoke was placed in a 50 ml beaker on a hot plate. Power was applied and the temperature of the liquid wood smoke measured with time and the volatilization observed. The results are summarized in Table 1.

TABLE 1

| Cherry Liquid Wood Smoke Volatilization Test | | |
|---|---|---|
| Time (min) | Temperature (°C.) | Observation |
| 10 min | 87° C. | Strong pungent odour |
| 15 min | 170° C. | About half volatilized |
| 20 min | 210° C. | Pleasant odour - very dark liquid |

TABLE 1-continued

Cherry Liquid Wood Smoke Volatilization Test

| Time (min) | Temperature (°C.) | Observation |
| --- | --- | --- |
| 30 min | 220° C. | Slight odour |

The residue remaining corresponded to 0.2 g or 8% or less of initial weight.

Example 10

Florite ® pellets containing 2.5 g hickory liquid wood smoke /g were heated in a similar way ot that described in Example 9. The rate of volatilization was slower with 15% remaining after 40 minutes when the temperature reached 220° C.

Example 11

9.5 g of liquid cherry wood smoke was adsorbed on a 50 mm diameter ×20 mm thick disc of Florite ®. The liquid wood smoke was adsorbed to a depth of 14 mm. The pellet was then placed unadsorbed side down on a laboratory hotplate set to control at 210° C. and the power switched on. The temperature of the hotplate surface and the top of the pellet and the weight loss monitored with time. The results are shown in Table 2.

TABLE 2

Volatilization of Cherry Liquid Wood Smoke Adsorbed on Florite ® at 210° C.

| Time (min) | 0 | 5 | 10 | 20 | 30 | 40 | 50 | 60 | 75 | 90 |
| --- | --- | --- | --- | --- | --- | --- | --- | --- | --- | --- |
| Temp. Hotplate (°C.) | 20 | 251 | 215 | 212 | 208 | 208 | 210 | 210 | 209 | 210 |
| Temp. Pellet Top (°C.) | 20 | 31 | 44 | 52 | 49 | 50 | 50 | 51 | 49 | 54 |
| Volatilized (%) | 0 | 2.7 | 7.9 | 17.3 | 24.9 | 32.0 | 37.3 | 43.2 | 49.4 | 53.9 |

The results show it is possible to steadily volatilize the liquid wood smoke over a period of several hours.

Example 12

Example 11 was repeated using 9.7 g of cherry liquid wood smoke on Florite ® with the hotplate temperature set at 283° C. The results of the test are shown in Table 3.

TABLE 3

Volatilization of Cherry Liquid Wood Smoke Adsorbed on Florite ® at 283° C.

| Time (min) | 0 | 5 | 10 | 20 | 31 | 40 | 50 | 60 | 75 | 90 |
| --- | --- | --- | --- | --- | --- | --- | --- | --- | --- | --- |
| Temp. Hotplate (°C.) | 22 | 305 | 288 | 283 | 283 | 283 | 282 | 283 | 284 | 283 |
| Temp. Pellet Top (°C.) | 22 | 28 | 42 | 63 | 56 | 63 | 70 | 65 | 68 | 82 |
| Volatilized (%) | 0 | 2.9 | 9.1 | 24.0 | 36.3 | 44.5 | 51.9 | 58.4 | 64.0 | 67.6 |

The results show that the liquid wood smoke can be volatilized at a greater rate at higher temperature.

SMOKED FOOD TESTS

Example 13

Using a smoker similar to that shown in FIG. 1 (except that this had no far infrared-radiating means), four tests were carried out using liquid wood smoke fractions prepared as described in Example 6. Pork chops (deboned) weighing about 75 g and of 10 mm thick were smoked for 50 minutes to an internal meat temperature of 84±1° C. Test 1 used no liquid wood smoke and Tests 2 to 4 used 8.0 g of fractions Nos. 1 to 3 respectively adsorbed on 50 mm disc Florite pellets.

After smoking, the meats were cooled and then sliced. A panel of 5 members judged them for appearance, taste and texture. Product from test 3 was judged best overall and best tasting. Product 4 was judged to have the best appearance and its taste was liked.

All smoked products were liked better than the unsmoked one. The color of the products increased with increasing fraction number.

Example 14

A similar test to that described in Example 12 was carried out except two pieces of pork were lightly salted and two were lightly salted and peppered. One of each was then smoked using both the fraction Nos. 2 and 3 of cherry liquid wood for 50 to 55 minutes. After cooling and slicing, a panel of 5 judges rated the products as delicious although preferring the salt and pepper treated ones. A good smoked flavour ranging from mild to very strong was produced.

Example 15

One piece of beef weighing 77 g was smoked in a system similar to that shown in FIG. 1 (except that this had no far infrared-radiating means). 8.4 g of hickory liquid wood smoke on a 50 mm tiameter ×20 mm thick pellet was used. The meat was smoked over one hour to an internal temperature of 68° C. 75% of the liquid wood was volatilized during this period. After smoking the meat was cooled and then sliced. A panel of judges found the product delicious and with good appearance.

COMPARISON OF THE SMOKER OF THE PRESENT INVENTION WITH COMMERCIAL SMOKER:

Example 16

Thick pieces of pork were smoked using both the smoker used in Example 15 (see FIG. 1) and a commercial smoker. Four pieces of pork 30 mm thick and weighing between 200 g and 250 g each were marinated for 3 hours in the following mixture.

| | |
| --- | --- |
| Soy Sauce | 80 ml |
| Honey | 4 teaspoon |
| Black Pepper | ⅜ teaspoon |
| Garlic Powder | ⅜ teaspoon |
| Salt | ¼ teaspoon |
| Ginger | 1 teaspoon |

Two pieces of the marinated pork were smoked to an internal temperature of 79° C. in 75 minutes in the smoker of the present invention. A 50 diameter Florite ® pellet containing 13.3 g of cherry liquid wood smoke was used to generate the smoke. 71.4% was volatilized during the 73 minutes smoking period.

For comparison, two pieces were also smoked in a commercial smoker, using a 133 g block of compressed cherry wood chips. The commercial smoker heater has a fixed output, so it is not possible to vary the temperature. After 4 hours, the internal meat temperature was 53° C. and had been constant for about 1 hour. The meat was removed from the smoker for examination. Although the meat was nicely smoked, the interior was uncooked with pink juices. The meat was therefore cooked to an internal temperature of 80° C. in a conventional oven.

Slices of both types of product were evaluated by a panel judges. The meat from the smoker of the present invention was judged to have a better taste and texture and equal appearance to that produced by the conventional smoker.

As explained in detail in the above, the present invention has the following advantages over the prior art.

(1) Only 13.3 g of liquid wood smoke required compared to 133 g compressed cherry wood for similar smoking.
(2) No messy ash to remove and dispose.
(3) Shorter smoking time.
(4) No additional cooking necessary.
(5) Juice and fat collecting system more efficient.
(6) Absorption of far infrared rays into the inside of material being smoked is possible by far infrared-radiating means, and uniform heating is possible in a short period of time.

Also the amount of smoke to be cleaned is significantly lower with the smoker of the present invention.

What is claimed is:

1. A method of smoking food which comprises the steps of suspending said food to be smoked in an enclosed heated zone, providing within said zone a mass of volatile liquid wood smoke, heating said liquid wood smoke mass to gradually volatilize the same, and determining the rate of volatilization of said liquid wood smoke body by varying amounts of liquid smoke present and its heating temperature.

2. A method as in claim 1, where the said liquid wood smoke is recovered by distillation of wood chips.

3. A method as in claim 1, where the said liquid wood smoke is recovered by solvent extraction of wood chips.

4. A method as in claim 1, where the heating temperature of said liquid smoke is from 100 to 400° C.

5. A method as in claim 4, where the liquid smoke heating temperature is from 150 to 300° C.

6. A method as in claim 1, where the food being smoked is heated at 30 to 200° C.

7. A method as in claim 6, where the food heating temperature is from 60 to 120° C.

8. The method of claim 1 wherein said mass of liquid wood smoke is absorbed onto an inert porous carrier.

9. The method of claim 8 wherein said carrier is a ceramic pellet.

10. The method of claim 1 wherein said food is heated by infrared radiation.

11. The method of claim 10 wherein said mass of liquid wood smoke is heated by contact with a heat source within said enclosed zone and said infrared radiation is reflected from said heat source.

* * * * *